A. L. LINCOLN.
Horseshoe.
No. 198,635. Patented Dec. 25, 1877.
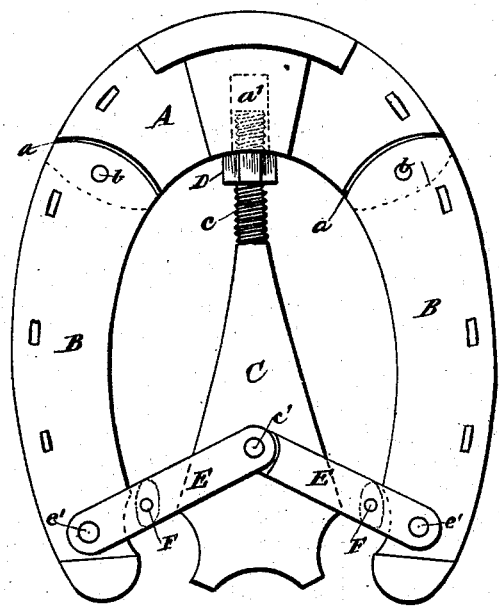

UNITED STATES PATENT OFFICE.

ALBERT L. LINCOLN, OF BETHEL, VERMONT.

IMPROVEMENT IN HORSESHOES.

Specification forming part of Letters Patent No. 198,635, dated December 25, 1877; application filed November 20, 1877.

*To all whom it may concern:*

Be it known that I, ALBERT L. LINCOLN, of Bethel, in the county of Windsor and State of Vermont, have invented a new and Improved Expansible Horseshoe, of which the following is a specification:

My invention is specially designed for gradually restoring contracted horse feet to a normal condition; and it consists in the combination, with a stationary toe-piece and pivoted side pieces, of an adjustable frog-pad and spurred connecting links or braces, for expanding and contracting the horseshoe, as will be hereinafter described.

In the accompanying drawings, Figure 1 represents a view of the under side of my expansible horseshoe. Fig. 2 represents perspective detail views of the toe-piece and spurred brace.

Similar letters of reference indicate corresponding parts.

A is the toe-piece of the horseshoe, rabbeted at $a$ for the reception of the rabbeted front ends of the side pieces B, which are secured to A at $a$ by the pivot-pins $b$, so that they may be spread apart or moved toward each other, as desired.

C is the frog-pad. The forward end of this is made in the shape of a bolt-shank, $c$, threaded, and provided with a nut, D, which works against the outer end or rim of a socket, $a'$, in the toe-piece A, into which the shank $c$ enters, and by which its threads are protected from injury.

E are links or braces, pivoted at $e'$, one to each side piece B at its rear end, and connected to the frog-pad with one common pivot, $c'$, in the fashion of an ordinary toggle-joint.

F are spurs attached to the braces E, and when in use resting against the bars in the horse's foot, a little obliquely to the said bars.

By tightening the nut D gradually against the toe-piece A, the frog-pad C will be moved rearward, tending to straighten the toggle-joint and turn the side pieces B on their pivots $b$, thereby gradually expanding or widening the horseshoe and, with it, the hoof.

When, as sometimes is the case, only one side of the hoof needs to be expanded, one side piece B is made solid with the toe-piece A, and the other alone pivoted to it, the other pieces remaining unchanged.

Having thus described my invention, I claim as new and desire to secure by Letters Patent—

1. The frog-pad C, provided with threads $c$ and nut D, and the braces E, in combination with the socketed toe-piece A and side pieces B, with their pivotal connections, substantially as and for the purpose set forth.

2. The toggle-braces E, having spurs F, in combination with sectional shoe A B B and the adjustable frog-pad C, as and for the purpose set forth.

ALBERT LEONARD LINCOLN.

Witnesses:
T. A. CHADWICK,
EDWIN FISHER.